C. F. DOERR.
CIRCULAR GLASS CUTTER.
APPLICATION FILED APR. 12, 1915.
1,179,706.
Patented Apr. 18, 1916.
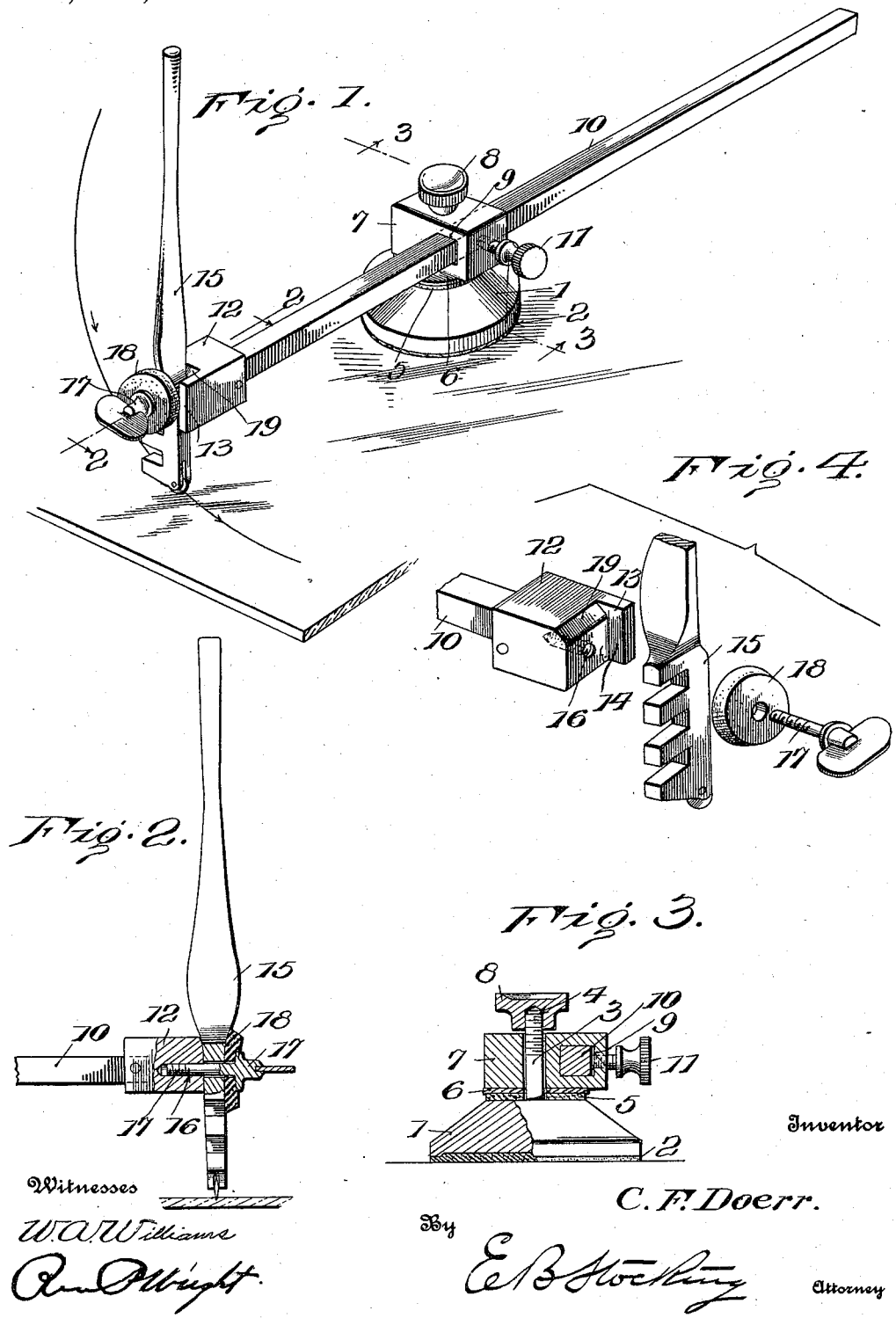
Inventor
C. F. Doerr.

UNITED STATES PATENT OFFICE.

CARL F. DOERR, OF YONKERS, NEW YORK, ASSIGNOR TO SMITH & HEMENWAY COMPANY, INCORPORATED, OF NEW YORK, N. Y., A CORPORATION OF NEW YORK.

CIRCULAR GLASS-CUTTER.

1,179,706.  Specification of Letters Patent.  Patented Apr. 18, 1916.

Application filed April 12, 1915. Serial No. 20,897.

*To all whom it may concern:*

Be it known that I, CARL F. DOERR, a citizen of the United States, residing at Yonkers, in the county of Westchester and State of New York, have invented certain new and useful Improvements in Circular Glass-Cutters, of which the following is a specification, reference being had therein to the accompanying drawing.

This invention relates to certain new and useful improvements in circular glass cutters; the object being to provide a circular glass cutter with a radius bar having a head provided with means for clamping an ordinary glass cutter thereto in such a manner that the cutter will be held rigid.

Another object of the invention is to provide a glass cutter with a base having a revoluble block mounted thereon in such a manner that the same can yield so as to bring the cutter into engagement with the glass being cut.

Another object of the invention is to provide clamping means for the glass cutter which will clamp various forms of cutter in such a manner that they will be held rigid in position to operate upon the glass being cut.

Other and further objects and advantages of the invention will be hereinafter set forth and the novel features thereof defined by the appended claims.

In the drawings Figure 1, is a perspective of my improved form of glass cutter; Fig. 2, is a section taken on the line 2—2 of Fig. 1; Fig. 3, is a section taken on the line 3—3 of Fig. 1; and Fig. 4, is a perspective of the radius bar and the block carried by the radius bar and the clamping means, showing a cutter ready to be inserted.

Like numerals of reference refer to like parts in the several figures of the drawings.

In carrying out my invention, I employ a circular base 1 which is preferably provided with a leather facing 2 forming a frictional surface so as to hold the base firmly in position upon the glass; said base being provided with a central vertically disposed stud 3 having a threaded upper end 4 as clearly shown in Fig. 3. Arranged over the stud is a yieldable washer 5 formed of any suitable material upon which a bearing washer 6 is mounted forming a bearing for a block 7 revolubly mounted upon the stud which is secured in position thereon by a thumb nut 8 working on the threaded end of the stud 3, said thumb nut being provided with a depression to receive the thumb in order to hold the base at a fixed point. The block 7 is provided with a horizontally disposed opening 9 preferably rectangular in cross section in which is slidably mounted a radius bar 10 conforming in shape to that of the opening, said radius bar being locked in adjusted position therein by a thumb screw 11 working in a threaded bore formed in the block which intersects the opening so as to allow the end of the thumb screw to engage the bar and hold the same securely.

Secured to one end of the bar 10 is a head member 12 provided with a vertically disposed extension 13 forming a substantially right-angled shoulder 14 adapted to receive an ordinary form of glass cutter as shown at 15, said head being provided with a threaded bore 16 into which is adapted to be screwed a wing screw 17 which is provided with a washer 18 for engaging one face of the glass cutter 15, said screw passing through one of the notches ordinarily formed in glass cutters of this kind, so as to hold the glass cutter in a rigid position within the socket as shown in Fig. 1.

It will be seen that by operating the wing screw the glass cutter can be easily inserted or detached from the head and in the form of head herein shown, the upper portion of the socket is beveled as shown at 19 to receive a portion of the handle of the glass cutter of the construction as herein shown but it is, of course, understood that glass cutters with other constructions of handle can be used in connection with the clamping device without departing from the spirit of my invention.

From the foregoing description, it will be seen that I have provided a circular glass cutter with a base for maintaining a fixed point for the radius arm which is so mounted that the same is allowed to yield in order to throw the cutter into engagement with the glass.

It will also be seen that a novel form of clamping means is employed to receive the cutter which holds the same rigid and in such position, that the cutter wheel thereof will engage the surface of the glass at the proper angle.

I claim:

1. A glass cutter, comprising a base having a revoluble block carrying a radius bar, a head fixed on said bar provided with a substantially right-angled shoulder, said head having a threaded bore in the end thereof, a screw carrying a washer and working within said bore for clamping a glass cutter against said head in contact with said shoulder.

2. As a new article of manufacture, a glass cutter, comprising a base having a revoluble block carrying a radius bar, a head fixed on one end of said bar having a vertically disposed extension, said head being provided with a threaded bore in its end spaced from said extension, a clamping screw working in said bore carrying a washer, a notched glass cutter embracing said screw and clamped thereby against the end of said head with the edge thereof in contact with said extension.

3. A glass cutter, comprising a base having a revoluble block carrying a radius bar having a head provided with an extension forming a shoulder at right-angles to the face of said head, said head being provided with a threaded bore, a screw carrying a washer and working in said threaded bore, and a glass cutter having a notch to receive said screw and having its edge in contact with said shoulder, said glass cutter being clamped against the end of said head by the washer of said screw.

In testimony whereof I hereunto affix my signature in the presence of two witnesses.

CARL F. DOERR.

Witnesses:
GEORGE W. BEHRENS,
J. F. HEMENWAY.

Copies of this patent may be obtained for five cents each, by addressing the "Commissioner of Patents, Washington, D. C."